(12) United States Patent
Rosenflanz et al.

(10) Patent No.: US 7,598,188 B2
(45) Date of Patent: Oct. 6, 2009

(54) CERAMIC MATERIALS AND METHODS OF MAKING AND USING THE SAME

(75) Inventors: Anatoly Z. Rosenflanz, Maplewood, MN (US); Berkan K. Endres, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/323,959

(22) Filed: Dec. 30, 2005

(65) Prior Publication Data

US 2008/0190034 A1    Aug. 14, 2008

(51) Int. Cl.
C03C 3/12      (2006.01)
C03C 3/21      (2006.01)
C03C 3/17      (2006.01)
C03C 10/02     (2006.01)
B24D 3/02      (2006.01)
C09C 1/68      (2006.01)

(52) U.S. Cl. .............................. 501/41; 501/46; 501/48; 501/10; 51/307; 51/309

(58) Field of Classification Search .................. 501/46, 501/41, 48, 10; 51/307, 309
See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,150,694 A | 3/1939 | Morey |
| 2,206,081 A | 7/1940 | Eberlin |
| 2,424,645 A | 7/1947 | Baumann, Jr. et al. |
| 2,618,567 A | 11/1952 | Comstock |
| 2,805,166 A | 9/1957 | Loffler |

(Continued)

FOREIGN PATENT DOCUMENTS

DE          141 420         10/1901

(Continued)

OTHER PUBLICATIONS

Krell, Andreas et al. "Transparent Sintered Corundum with High Hardness and Strength" Journal of the American Ceramic Society. Jan. 2003. vol. 86 (1), p. 12-18.*

(Continued)

*Primary Examiner*—Karl E Group
*Assistant Examiner*—Noah S Wiese

(57) ABSTRACT

Ceramic materials and articles comprising at least 35 percent by weight $Al_2O_3$, and a plurality of cells having an average cell size of less than 3 micrometers.

11 Claims, 7 Drawing Sheets

U.S. PATENT DOCUMENTS

| | | |
|---|---|---|
| 2,958,593 A | 11/1960 | Hoover et al. |
| 2,961,296 A | 11/1960 | Fenerty |
| 3,041,156 A | 6/1962 | Rowse |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | MacDowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,097,295 A | 6/1978 | Chyung et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,271,011 A | 6/1981 | Spencer et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papai et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,940,678 A | 7/1990 | Aitken |
| 4,950,294 A | 8/1990 | Hakamatsuka |
| 4,960,441 A | 10/1990 | Pellow et al. |
| 4,997,461 A | 3/1991 | Markhoff-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,094,711 A | 3/1992 | Narasimhan et al. |
| 5,104,319 A | 4/1992 | Evans et al. |
| 5,108,477 A * | 4/1992 | Cornelius et al. ............ 65/17.3 |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,178,335 A | 1/1993 | Mertens |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,229,336 A | 7/1993 | Akiyama et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |

| | | | | | | |
|---|---|---|---|---|---|---|
| 5,417,726 A | 5/1995 | Stout et al. | 6,484,539 B1 | 11/2002 | Nordine et al. | |
| 5,427,595 A | 6/1995 | Pihl et al. | 6,511,739 B2 | 1/2003 | Kasai et al. | |
| 5,429,647 A | 7/1995 | Larmie | 6,514,892 B1 | 2/2003 | Kasai et al. | |
| 5,431,704 A | 7/1995 | Tamamaki et al. | 6,521,004 B1 | 2/2003 | Culler et al. | |
| 5,436,063 A | 7/1995 | Follett et al. | 6,557,378 B2 | 5/2003 | Takagi et al. | |
| 5,443,906 A | 8/1995 | Pihl et al. | 6,582,488 B1 | 6/2003 | Rosenflanz | |
| 5,449,389 A | 9/1995 | Yoshizumi et al. | 6,583,080 B1 | 6/2003 | Rosenflanz | |
| 5,484,752 A | 1/1996 | Waku et al. | 6,589,305 B1 | 7/2003 | Rosenflanz | |
| 5,496,386 A | 3/1996 | Broberg et al. | 6,592,640 B1 | 7/2003 | Rosenflanz et al. | |
| 5,498,269 A | 3/1996 | Larmie | 6,596,041 B2 | 7/2003 | Rosenflanz | |
| 5,516,348 A | 5/1996 | Conwell et al. | 6,607,570 B1 | 8/2003 | Rosenflanz et al. | |
| 5,520,711 A | 5/1996 | Helmin et al. | 6,620,214 B2 | 9/2003 | McArdle et al. | |
| 5,534,843 A | 7/1996 | Tsunoda et al. | 6,666,750 B1 | 12/2003 | Rosenflanz | |
| 5,547,479 A | 8/1996 | Conwell et al. | 6,669,749 B1 | 12/2003 | Rosenflanz et al. | |
| 5,549,962 A | 8/1996 | Holmes et al. | 6,702,867 B2 * | 3/2004 | Carman et al. | 51/307 |
| 5,551,963 A | 9/1996 | Larmie | 6,706,083 B1 | 3/2004 | Rosenflanz | |
| 5,552,213 A | 9/1996 | Eschner | 6,749,653 B2 | 6/2004 | Castro et al. | |
| 5,569,547 A | 10/1996 | Waku et al. | 6,790,126 B2 | 9/2004 | Wood et al. | |
| 5,593,467 A | 1/1997 | Monroe | 6,984,261 B2 | 1/2006 | Cummings et al. | |
| 5,605,870 A | 2/1997 | Strom-Olsen et al. | 7,022,173 B2 | 4/2006 | Cummings et al. | |
| 5,609,706 A | 3/1997 | Benedict et al. | 7,101,819 B2 | 9/2006 | Rosenflanz | |
| 5,641,469 A | 6/1997 | Garg et al. | 7,141,522 B2 | 11/2006 | Rosenflanz et al. | |
| 5,645,619 A | 7/1997 | Erickson et al. | 7,141,523 B2 | 11/2006 | Rosenflanz et al. | |
| 5,651,925 A | 7/1997 | Ashley et al. | 7,147,544 B2 | 12/2006 | Rosenflanz | |
| 5,653,775 A | 8/1997 | Plovnick et al. | 7,168,267 B2 | 1/2007 | Rosenflanz et al. | |
| 5,665,127 A | 9/1997 | Moltgen et al. | 7,175,786 B2 | 2/2007 | Celikkaya et al. | |
| 5,679,067 A | 10/1997 | Johnson et al. | 7,179,526 B2 | 2/2007 | Rosenflanz et al. | |
| 5,682,082 A | 10/1997 | Wei et al. | 2002/0066233 A1 | 6/2002 | McArdle et al. | |
| 5,693,239 A | 12/1997 | Wang et al. | 2003/0040423 A1 | 2/2003 | Harada et al. | |
| 5,721,188 A | 2/1998 | Sung et al. | 2003/0110706 A1 | 6/2003 | Rosenflanz | |
| 5,725,162 A | 3/1998 | Garg et al. | 2003/0110707 A1 | 6/2003 | Rosenflanz et al. | |
| 5,728,184 A * | 3/1998 | Monroe ............ 51/309 | 2003/0110708 A1 | 6/2003 | Rosenflanz | |
| 5,733,178 A | 3/1998 | Ohishi | 2003/0115805 A1 | 6/2003 | Rosenflanz et al. | |
| 5,733,564 A | 3/1998 | Lehtinen | 2003/0126802 A1 | 7/2003 | Rosenflanz | |
| 5,738,696 A | 4/1998 | Wu | 2003/0126803 A1 | 7/2003 | Rosenflanz | |
| 5,747,397 A | 5/1998 | McPherson et al. | 2003/0126804 A1 * | 7/2003 | Rosenflanz et al. | 51/307 |
| 5,763,345 A | 6/1998 | Ohshima et al. | 2004/0020245 A1 | 2/2004 | Rosenflanz et al. | |
| 5,782,940 A | 7/1998 | Jayan et al. | 2004/0148868 A1 | 8/2004 | Anderson et al. | |
| 5,804,513 A | 9/1998 | Sakatani et al. | 2004/0148870 A1 | 8/2004 | Celikkaya et al. | |
| 5,839,674 A | 11/1998 | Ellis | 2004/0148967 A1 | 8/2004 | Celikkaya et al. | |
| 5,847,865 A | 12/1998 | Gopinath et al. | 2005/0053266 A1 | 3/2005 | Plumb et al. | |
| 5,856,254 A | 1/1999 | Feige et al. | 2005/0056055 A1 | 3/2005 | Celikkaya et al. | |
| 5,863,308 A | 1/1999 | Qi et al. | 2005/0060948 A1 | 3/2005 | Rosenflanz | |
| 5,876,470 A | 3/1999 | Abrahamson | 2005/0075233 A1 | 4/2005 | Weber et al. | |
| 5,902,763 A | 5/1999 | Waku et al. | 2005/0109060 A1 | 5/2005 | Cummings et al. | |
| 5,903,951 A | 5/1999 | Ionta et al. | 2005/0132656 A1 | 6/2005 | Anderson et al. | |
| 5,952,256 A | 9/1999 | Morishita et al. | 2005/0132657 A1 | 6/2005 | Celikkaya et al. | |
| 5,954,844 A | 9/1999 | Law et al. | 2005/0132658 A1 | 6/2005 | Celikkaya et al. | |
| 5,961,674 A | 10/1999 | Gagliardi et al. | 2005/0133974 A1 | 6/2005 | Celikkaya et al. | |
| 5,975,988 A | 11/1999 | Christianson | 2005/0136176 A1 | 6/2005 | Rosenflanz et al. | |
| 5,976,274 A | 11/1999 | Inoue et al. | 2005/0137076 A1 | 6/2005 | Rosenflanz et al. | |
| 5,981,413 A | 11/1999 | Hale | 2005/0137077 A1 | 6/2005 | Bange et al. | |
| 5,981,415 A | 11/1999 | Waku et al. | 2005/0137078 A1 * | 6/2005 | Anderson et al. | 501/127 |
| 6,054,093 A | 4/2000 | Torre, Jr. et al. | 2006/0021285 A1 | 2/2006 | Rosenflanz et al. | |
| 6,123,743 A | 9/2000 | Carman et al. | 2006/0022385 A1 | 2/2006 | Rosenflanz | |
| 6,128,430 A | 10/2000 | Chu et al. | 2007/0079631 A1 | 4/2007 | Rosenflanz | |
| 6,146,244 A | 11/2000 | Atsugi et al. | 2007/0087928 A1 | 4/2007 | Rosenflanz | |
| 6,214,429 B1 | 4/2001 | Zou et al. | 2007/0151166 A1 * | 7/2007 | Endres et al. | 51/307 |
| 6,245,700 B1 | 6/2001 | Budd et al. | | | | |
| 6,251,813 B1 | 6/2001 | Sato | | | | |
| 6,254,981 B1 | 7/2001 | Castle | | | | |
| 6,268,303 B1 | 7/2001 | Aitken et al. | | | | |
| 6,306,926 B1 | 10/2001 | Bretscher et al. | | | | |
| 6,335,083 B1 | 1/2002 | Kasai et al. | | | | |
| 6,361,414 B1 | 3/2002 | Ravkin et al. | | | | |
| 6,447,937 B1 | 9/2002 | Murakawa et al. | | | | |
| 6,451,077 B1 | 9/2002 | Rosenflanz | | | | |
| 6,454,822 B1 | 9/2002 | Rosenflanz | | | | |
| 6,458,731 B1 | 10/2002 | Rosenflanz | | | | |
| 6,461,988 B2 | 10/2002 | Budd et al. | | | | |
| 6,469,825 B1 | 10/2002 | Digonnet et al. | | | | |
| 6,482,758 B1 | 11/2002 | Weber et al. | | | | |
| 6,482,761 B1 | 11/2002 | Watanabe et al. | | | | |

FOREIGN PATENT DOCUMENTS

| | | |
|---|---|---|
| FR | 1 547 989 | 12/1967 |
| FR | 2 118 026 | 12/1971 |
| FR | 2 538 370 | 12/1982 |
| GB | 793 503 | 4/1958 |
| GB | 1 005 338 | 9/1965 |
| GB | 1 260 933 | 1/1972 |
| GB | 2 377 438 | 1/2003 |
| JP | 50-25608 | 3/1975 |
| JP | 62-3041 | 1/1987 |
| JP | 4-119941 | 4/1992 |
| JP | 6-171974 | 6/1994 |
| JP | 11-189926 | 7/1999 |

| JP | 2000-45129 | 2/2000 |
| JP | 2003-94414 | 4/2003 |
| WO | WO 01/16047 A2 | 3/2001 |
| WO | WO 02/08143 A3 | 1/2002 |
| WO | WO 03/011776 A1 | 2/2003 |
| WO | WO 03/011781 A2 | 2/2003 |
| WO | WO 2004/016821 A2 | 2/2004 |
| WO | WO 2004/071980 A3 | 8/2004 |
| WO | WO 2004/098002 A1 | 11/2004 |
| WO | WO 2005/035457 A1 | 4/2005 |
| WO | WO 2005/061401 A3 | 7/2005 |

OTHER PUBLICATIONS

Aasland, S. and McMillan, P.F., "Density-Driven Liquid-Liquid Phase Separation in the System $Al_2O_3$-$Y_2O_3$," Nature, vol. 369, Jun. 23, 1994, pp. 633-636.

Aguilar, et al., "Melt Extraction Processing of Structural $Y_2O_3$-$Al_2O_3$ Fibers," J. Eur. Ceram. Soc. 20 1091-1098 (2000).

Bagaasen, L.M., et al., "Silicon-Free Oxynitride Glasses Via Nitridation of Aluminate Glassmelts," Journal of the American Ceramic Society, vol. 66, No. 4, Apr. 1983, pp. C-69-C-71.

Brewer, Luke N. et al., "Interface modification for increased fracture toughness in reaction-formed yttrium aluminum garnet/alumina eutectic composites," 1999, vol. 14, No. 10, pp. 3907-3912.

Brockway et al. "Rapid Solidification of Ceramics a Technology Assessment", Metals and Ceramics Information Center, MCIC Report, Jan. 1984 MCIC 1-52.

Chen, Zan-Hwey et al., "Microstructures of laser-treated $Al_2O_3$-$ZrO_2$-$CeO_2$ composites," Materials Science & Engineering A (Structural Materials: Properties, Microstructure and Processing), 1995, vol. A196, No. 1-2, pp. 253-260.

Coutures et al., "Production and Studies of Alumina Based Refractory Glass," Mat. Res. Bull., vol. 10, No. 6, 1975, pp. 539-546.

Durham, James A., "Low Silica Calcium Aluminate Oxynitride Glasses," Materials Letters, vol. 7, No. 5,6, Nov. 1988, pp. 208-210.

Gandhi, A. S. and Jarayam, V., "Pressure Consolidation of Amorphous $ZrO_2$-$Al_2O_3$ by Plastic Deformation of Powder Particles," Acta Materiala, 50 (2002), 2137-2149.

Gonzalez, Eduardo J., et al., "High Pressure Compaction and Sintering of Non-Size y-$Al_2O_3$ Powder," Materials and Manufacturing Processes, vol. 11, No. 6, 951-967, (1996).

Hrovat et al., "Preliminary data on subsolidus phase equilibria in the $La_2O_3$-$Al_2O_3$-$Mn_2O_3$ and $La_2O_3$-$Al_2O_3$-$Fe_2O_3$ systems", Journal of Materials Science Letters, vol. 14, 1995, pp. 265-267.

Jantzen, C. M., Krepski, R. P., and Herman, H., "Ultra-Rapid Quenching of Laser-Method Binary and Unary Oxides," Mat. Res. Bull. 15, 1313-1326 (1980).

Khor, K.A., "Novel ZrO2-Mullite Composites Produced by Plasma Spraying," Proceedings of the 15$^{th}$ International Thermal Pray Conference, 25-29, May 1998, Nice, France.

Kingery, W.D., Introduction to Ceramics, Second Edition, Chpt. III subchapter 8.8, Glass-Ceramic Materials, pp. 368-374, (1976).

Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.

Kondrashov V I et al., "Opacified Glass "Decorit" Synthesis Directions", Steklo I Keramika 2001, No. 1, pp. 8-11. Title translated by Keramika as "Aspects of Synthesis of Decorite Opacified Glass".

Krokhin et al., "Synthesis of Y-Al Garnet", Glass and Ceramics, vol. 55, Nos. 5-6, 1998, pp. 151-152.

Lakiza et al., "The Liquidus Surface In The $Al_2O_3$-$ZrO_2$-$Y_2O_3$ Phase Diagram", Powder Metallurgy and Metal Ceramics, vol. 33, No. 11-12, 1994, pp. 595-597.

McMillan, P.W., Glass-Ceramics, Academic Press, Inc., 2$^{nd}$ Edition (1979).

"Phase Identification of $Al_2O_3$/$RE_3Al_5O_{12}$ and $Al_2O_3$/$REAlO_3$ (RE=Sm-Lu, Y) Eutectics", J. Crystal Growth, 218, 2000, pp. 67-73.

Ray, C.S. and Day, D.E., "Determining the Nucleation Rate Curve for Lithium Disilicate Glass by Differential Thermal Analysis," J. Am. Ceram. Soc. 73(2) 439-442 (1990).

Rosenflanz, A., et al., "Bulk Glasses and Ultrahard Nanoceramics Based on Alumina and Rare-Earth Oxides," Letters to Nature, vol. 430, Aug. 2004, pp. 761-764.

Sarjeant, P.T. and Roy, R., in Reactivity of Solids (ed.J.W. Mitchell, R.C., DeVries, R.W. Roberts and P. Cannon) 725-33 (John Wiley & Sons, Inc., New York, 1969).

Schmucker, M., et al., "Constitution of Mullite Glasses Produced by Ultra-Rapid Quenching of Plasma-Sprayed Melts," Journal of the European Ceramic Society 15 (1995) 1201-1205.

Shishido et al., "$Gd_3Al_5O_{12}$ Phase Obtained by Crystallization of Amorphous $Gd_2O_3 \cdot ^5/_3 Al_2O_3$," Journal of the American Ceramic Society, vol. 61, No. 7-8, Jul.-Aug. 1978, pp. 373-374.

Shishido, T., et al., "Ln-M-O Glasses Obtained by Rapid Quenching Using a Laser Beam", Journal of Materials Science, vol. 13 (1978), pp. 1006-1014.

Stankus, S. V. et al., "Crystallization and Thermal Properties of $Al_2O_3$-$Y_2O_3$ Melts", J. Crystal Growth, 167, 1996, pp. 165-170.

Stookey. S. D., Ceramics Made by Nucleation of Glass-Comparison of Microstructure and Properties with Sintered Ceramics, The American Ceramic Society, (1992), pp 1-4.

Suzuki et al., "Rapid Quanching on the Binary Systems of High Temperature Oxides," Mat. Res. Bull., vol. 9, 1974, pp. 745-754.

Takamori, T., Roy, R., "Rapid Crystallization of $SiO_2$-$Al_2O_3$ Glasses," Journal of American Society, vol. 56, No. 12, Dec. 1973.

Topol, L.E. et al., "Formation of New Oxide Glasses by Laser Spin Melting and Free Fall Cooling", Journal of Non-Crystalline Solids, vol. 12 (1973) pp. 377-390.

Topol, L.E. and Happe, R.A., "Formation of New Lanthanide Oxide Glasses by Laser Spin Melting and Free-Fall Cooling", Journal of Non-Crystalline Solids, vol. 15 (1974) pp. 116-124.

Toropov et al., "Phase Equilibria in the Yttrium Oxide-Alumina System", Bulletin of the Academy of Sciences, USSR, Division of Chemical Science, No. 7, Jul. 1964, pp. 1076-1081, A translation of Seriya Khimicheskaya.

Varshneya, Arun K., "Fundamentals of Inorganic Glasses", pp. 425-427 (1994).

Waku et al., "A ductile ceramic eutectic composite with high strength at 1,873 K", Nature, vol. 389, Sep. 1997, pp. 49-52.

Waku, Yoshiharu, "A New Ceramic Eutectic Composite with High Strength at 1873 K", Advanced Materials, vol. 10, No. 8, 1998, pp. 615-617.

Waku, Yoshiharu, et al., "A jelly-like ceramic fiber at 1193 K", Mat Res Innovat, 2000, vol. 3, pp. 185-189.

Weber et al., Device Materials Based on Er-, Ho-, Tm-, and Yb-Doped Rare Earth Aluminum Oxide (REAl™) Glass, reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

Weber et al., "Rare Earth Oxide-Aluminum Oxide Glasses for Mid-Range IR Devices," reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Weber, J.K. Richard et al., "Glass fibres of pure and erbium- or neodymium-doped yttria-alumina compositions", Nature, Jun. 25, 1998, vol. 393, pp. 769-771.

Weber, J.K. Richard et al., "Glass Formation and Polyamorphism in Rare-Earth Oxide-Aluminum Oxide Compositions", J. American Ceramic Society, 83 [8], 2000, 1868-1872.

Weber et al., "Synthesis and Optical Properties of Rare-Earth-Aluminum Oxide Glasses," J. Am. Ceram. Soc. 85(5) 1309-1311 (2002).

Wilding, M.C., McMillan, P.F., "Polyamorphic Transitions in Yttria-Alumina Liquids," J. Non-Crys. Solids. 293-295, 357-365 (2001).

Yajima et al., Glass Formation in the Ln-Al-O System, (Ln: Lanthanoid and Yttrium Elements), Chemistry Letters, 1973, pp. 1327-1330.

Yajima et al., "Unusual Glass Formation in the Al-Nd-O System," Chemistry Letters (published by the Chemical Society of Japan), 1973, pp. 741-742.

Yang and Zhu, "Thermo-Mechanical Stability Of Directionally Solidified $Al_2O_3$-$ZrO_2(Y_2O_3)$ Eutectic Fibers", Scripta Materialia, vol. 36, No. 8, 1997, pp. 961-965.

U.S. Appl. No. entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Appl. No. entitled, "Method of Making Ceramic Articles", filed Aug. 2, 2002, Rosenflanz having U.S. Appl. No. 10/211,491.

U.S. Appl. No. entitled "Metal Oxide Ceramic and Method of Making Articles Therewith," filed Jan. 15, 2007, Rosenflanz, having U.S. Appl. No. 11/623,129.

U.S. Appl. No. entitled "Plasma Spraying," filed Dec. 18, 2006, Rosenflanz et al., having U.S. Appl. No. 11/612,009.

U.S. Appl. No. entitled "Ceramics and Methods of Making the Same", filed Feb. 5, 2003, Celikkaya et al., having a U.S. Appl. No. 10/358,910.

U.S. Appl. No. entitled "Use of Glasses Containing Rare Earth Oxide, Alumina, and Zirconia And Dopant In Optical Waveguides", filed Apr. 28, 2003, having U.S. Appl. No. 10/425,039.

U.S. Appl. No. entitled "Composite Articles and Methods of Making the Same" filed Dec. 30, 2005, having U.S. Appl. No. 11/323,450.

U.S. Appl. No. entitled "Pavement Marking, Reflective Elements, and Methods of Making Microspheres", filed Nov. 14, 2005, having U.S. Appl. No. 11/273,513.

U.S. Appl. No. entitled "Method of Making Abrasive Articles, Cutting Tools, and Cutting Tool Inserts," filed Dec. 30, 2005, having U.S. Appl. No. 11/323,933.

U.S. Appl. No. entitled "LED Extractor Composed of High Index Glass," filed May 3, 2006, having U.S. Appl. No. 11/381,518.

U.S. Appl. No. entitled "Ceramic Materials and Methods of Making and Using the Same," filed on Dec. 30, 2005, having U.S. Appl. No. 11/323,959.

U.S. Appl. No. entitled "Method of Reshaping a Glass Body", filed Sep. 15, 2006, having U.S. Appl. No. 11/521,913.

U.S. Appl. No. entitled "Glass-ceramics and Methods of Making Same," filed Sep. 15, 2006, having U.S. Appl. No. 11/521,842.

U.S. Appl. No. entitled "Transparent Armor Composites and Methods of making Same", filed Sep. 15, 2006, having U.S. Appl. No. 11/521,725.

U.S. Appl. No. entitled "Armor Composites and Methods of Making Same," filed Sep. 15, 2006, having U.S. Appl. No. 11/522,076.

U.S. Appl. No. entitled "Methods of Making LED Extractor Arrays," filed May 3, 2006, having U.S. Appl. No. 11/381,512.

* cited by examiner

US 7,598,188 B2

CERAMIC MATERIALS AND METHODS OF MAKING AND USING THE SAME

BACKGROUND

Ceramic materials comprising alumina along with other metal oxides are known in the art. These materials are generally recognized for their fracture toughness and strength characteristics.

There is a continuing desire for new and larger (i.e., 3 millimeters and larger) ceramic materials with relatively high fracture toughness and strength characteristics, including new materials for abrasive articles and cutting tools and cutting tool inserts, as well as methods for making the same.

SUMMARY

In one aspect, the present invention provides amorphous material comprising at least 35 (in some embodiments, at least 40, 45, 50, 55, 60, 65, 70, 75, 80, 85, or even at least 90) percent by weight $Al_2O_3$, based on the total weight of the amorphous material, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the amorphous material contains not more than 10 (in some embodiments preferably, less than 5, 4, 3, 2, 1, or even zero) percent by weight collectively $As_2O_3$, $B_2O_3$, $Bi_2O_3$, $GeO_2$, $P_2O_5$, $SiO_2$, $TeO_2$, and $V_2O_5$ (in some embodiments, alkaline and alkaline earth metal oxides also), based on the total weight of the amorphous material, wherein the amorphous material has a plurality of cells having an average cell size of less than 3 micrometers (in some embodiments, less than 2, 1, 0.75, or even less than 0.5 micrometers).

In some embodiments, the amorphous material has x, y, and z dimensions each perpendicular to each other, wherein each of the x and y dimensions is at least 5 mm (in some embodiments, at least 6, 7, 8, 9, or even at least 10 mm). Optionally, the z dimension in some embodiments is at least 5 mm (in some embodiments, at least 6, 7, 8, 9, or even at least 10 mm).

The x, y, and z dimensions of a material are determined either visually or using microscopy, depending on the magnitude of the dimensions. The reported x dimension is, for example, the diameter of a sphere, the thickness of a coating, or the longest length of a prismatic shape.

In one aspect, the present invention provides amorphous material comprising at least 35 (in some embodiments, preferably at least 40, 45, 50, 55, 60, 65, 70, 75, 80, 85, or even at least 90) percent by weight $Al_2O_3$, based on the total weight of the amorphous material, and CaO or $ZrO_2$, wherein the amorphous material contains not more than 10 (in some embodiments preferably, less than 5, 4, 3, 2, 1, or even zero) percent by weight collectively $As_2O_3$, $B_2O_3$, $Bi_2O_3$, $GeO_2$, $P_2O_5$, $SiO_2$, $TeO_2$, and $V_2O_5$, based on the total weight of the amorphous material, and a metal oxide other than $Al_2O_3$, CaO, and $ZrO_2$ at least a portion of which forms a distinct crystalline phase if the amorphous material is crystallized. In some embodiments, the amorphous material has x, y, and z dimensions each perpendicular to each other, wherein each of the x, y, and z dimensions is at least 3 mm (in some embodiments, at least 5, 6, 7, 8, 9, or 10 mm). Optionally, the amorphous material is heat-treated such that at least a portion of the amorphous material is converted to a glass-ceramic.

A "distinct crystalline phase" is a crystalline phase that is detectable by x-ray diffraction as opposed to a phase that is present in solid solution with another distinct crystalline phase. For example, it is well known that oxides such as $Y_2O_3$ or $CeO_2$ may be in solid solution with a crystalline $ZrO_2$ and serve as a phase stabilizer. The $Y_2O_3$ or $CeO_2$ in such instances is not a distinct crystalline phase.

In some embodiments, the ceramic material does not have a $T_g$. In other embodiments, the ceramic material is a glass.

In some embodiments, the amorphous material comprises at least 10 percent (in some embodiments at least 15, 20, 25, 30, or 35 percent) by weight of the metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), based on the total weight of the amorphous material.

In some embodiments, the amorphous material may be present in another material (e.g., particles comprising the amorphous material according to the present invention, ceramic comprising the amorphous material according to the present invention, etc.). Optionally, the amorphous material (including a glass) is heat-treated such that at least a portion of the amorphous material is converted to a glass-ceramic.

In one aspect, the present invention provides glass comprising at least 35 (in some embodiments, at least 40, 45, 50, 55, 60, 65, 70, 75, 80, 85, or even at least 90) percent by weight $Al_2O_3$, based on the total weight of the glass, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the glass contains not more than 10 (in some embodiments preferably, less than 5, 4, 3, 2, 1, or even zero) percent by weight collectively $As_2O_3$, $B_2O_3$, $Bi_2O_3$, $GeO_2$, $P_2O_5$, $SiO_2$, $TeO_2$, and $V_2O_5$, based on the total weight of the glass, wherein the glass has a plurality of cells having an average cell size of less than 3 micrometers (in some embodiments, less than 2, 1, 0.75, or even less than 0.5 micrometers).

In some embodiments, the glass has x, y, and z dimensions each perpendicular to each other, wherein each of the x and y dimensions is at least 5 mm (in some embodiments, at least 6, 7, 8, 9, or even at least 10 mm). Optionally, the z dimension in some embodiments is at least 5 mm (in some embodiments, at least 6, 7, 8, 9, or even at least 10 mm).

In another aspect, the present invention provides glass-ceramic comprising at least 35 (in some embodiments, at least 40, 45, 50, 55, 60, 65, 70, 75, 80, 85, or even at least 90) percent by weight $Al_2O_3$, based on the total weight of the glass, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the glass-ceramic contains not more than 10 (in some embodiments preferably, less than 5, 4, 3, 2, 1, or even zero) percent by weight collectively $As_2O_3$, $B_2O_3$, $Bi_2O_3$, $GeO_2$, $P_2O_5$, $SiO_2$, $TeO_2$, and $V_2O_5$, based on the total weight of the glass-ceramic, wherein the glass has a plurality of cells having an average cell size of less than 3 micrometers (in some embodiments, less than 2, 1, 0.75, or even less than 0.5 micrometers).

In some embodiments, the glass-ceramic has x, y, and z dimensions each perpendicular to each other, wherein each of the x and y dimensions is at least 5 mm (in some embodiments, at least 6, 7, 8, 9, or even at least 10 mm). Optionally, the z dimension in some embodiments is at least 5 mm (in some embodiments, at least 6, 7, 8, 9, or even at least 10 mm).

In another aspect, the present invention provides a glass-ceramic comprising a plurality of cells having an average cell size of less than 3 micrometers, wherein the glass-ceramic has a hardness of at least 15 GPa (in some embodiments, 16, 17, 18, or even 19 GPa) and a flexural strength of at least 400 MPa (in some embodiments, 500 or even 600 MPa).

In another aspect, the present invention provides a method for making articles, the method comprising:

providing a plurality of glass bodies having an average particle size of less than 3 micrometers (in some embodiments, less than 2, 1, 0.75, or even less than 0.5 micrometers), wherein the glass bodies comprise at least 35 percent by weight $Al_2O_3$, based on the total weight of the glass bodies, and a metal oxide other than $Al_2O_3$, wherein the glass bodies contains not more than 10 percent by weight collectively $As_2O_3$, $B_2O_3$, $Bi_2O_3$, $GeO_2$, $P_2O_5$, $SiO_2$, $TeO_2$, and $V_2O_5$, based on the total weight of the glass bodies, wherein the glass bodies have a $T_g$ and $T_x$, and wherein the difference between the $T_g$ and the $T_x$ of the glass bodies is at least 5K; and heating the glass bodies above the $T_g$ and coalescing at least a portion of the plurality of glass bodies to provide the article.

Optionally, the article is heat-treated such that at least a portion of the article is converted to a glass-ceramic. In some embodiments, the glass bodies are reduced to a size of 3 micrometers by milling a plurality of precursor glass bodies to form the glass bodies. In some embodiments, the heating of the glass bodies above the Tg and the heat-treating of the composite body are accomplished in one step.

The ceramics of the present invention can be used in various applications, including for example, coatings, abrasive articles, cutting tools and cutting tool inserts, and other articles. The coatings can be useful, for example, as protective coatings in applications involving wear, as well as for thermal management. Examples of articles according of the present invention include medical devices (implants, dental brackets, etc), reinforcing fibers, tools, and structural components (e.g., valves and bearings).

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"cell" refers to the smallest structural unit of a ceramic material that forms at least two distinct crystalline phases if the ceramic material is crystallized. In an amorphous material, a cell is essentially uniform in composition and essentially free of microstructural features (e.g., grain boundaries). In the context of the present invention, an individual cell generally corresponds to the individual body (e.g., particle, glass body, etc.) that is coalesced with a plurality of other bodies to form a larger consolidated ceramic material. The size of a cell can be determined using metallography and microscopic methods known in the art (e.g., SEM, TEM).

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$-metal oxide, etc.) is crystalline, for example, in a glass-ceramic, it may be glass, crystalline, or portions glass and portions crystalline. For example, if a glass-ceramic comprises $Al_2O_3$ and $ZrO_2$, the $Al_2O_3$ and $ZrO_2$ may each be in a glassy state, crystalline state, or portions in a glassy state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$-metal oxides).

DETAILED DESCRIPTION

Figure 1:
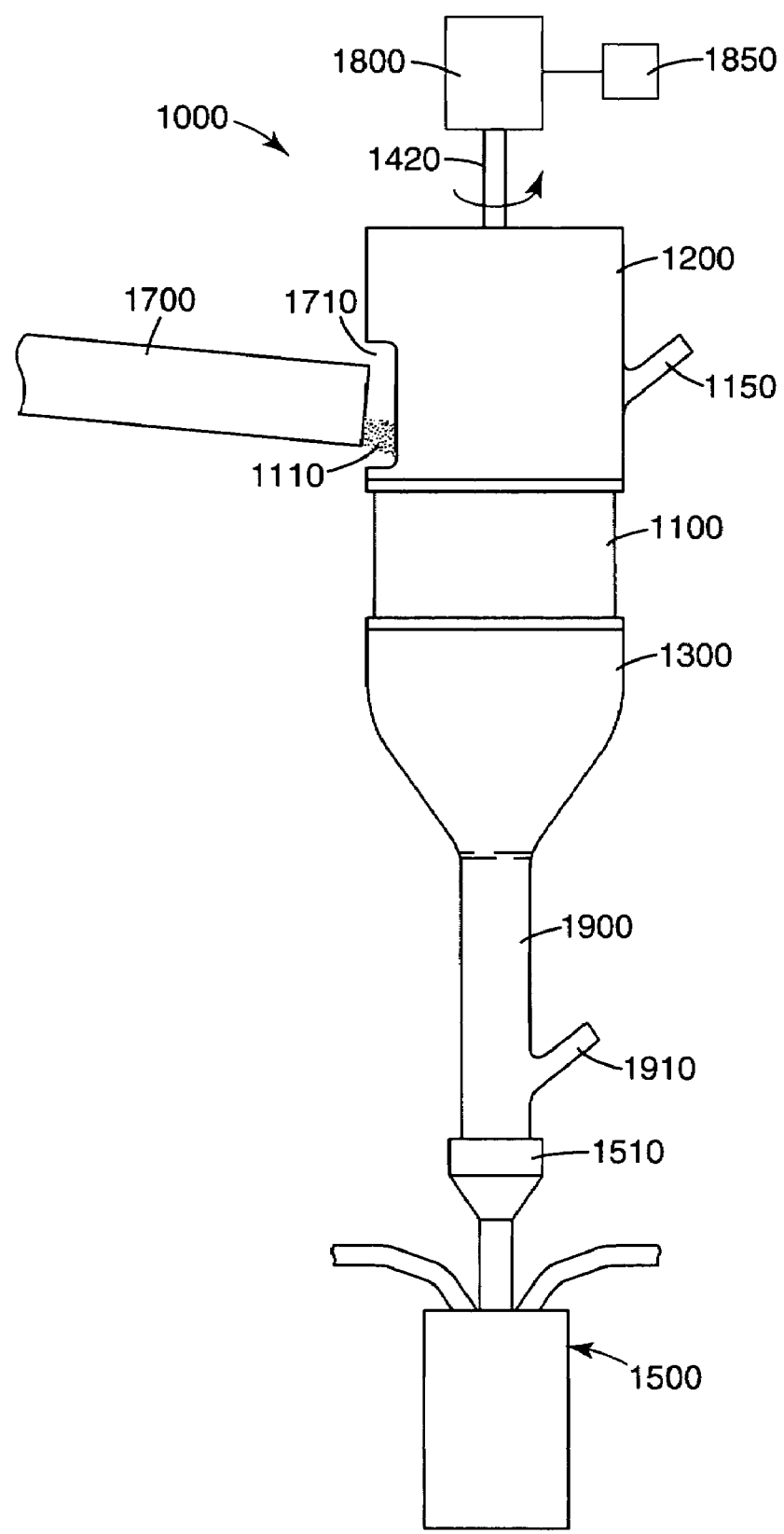
FIG. 1 is a side view of an exemplary embodiment of an apparatus including a powder feeder assembly for a flame-melting apparatus.
Figure 2:
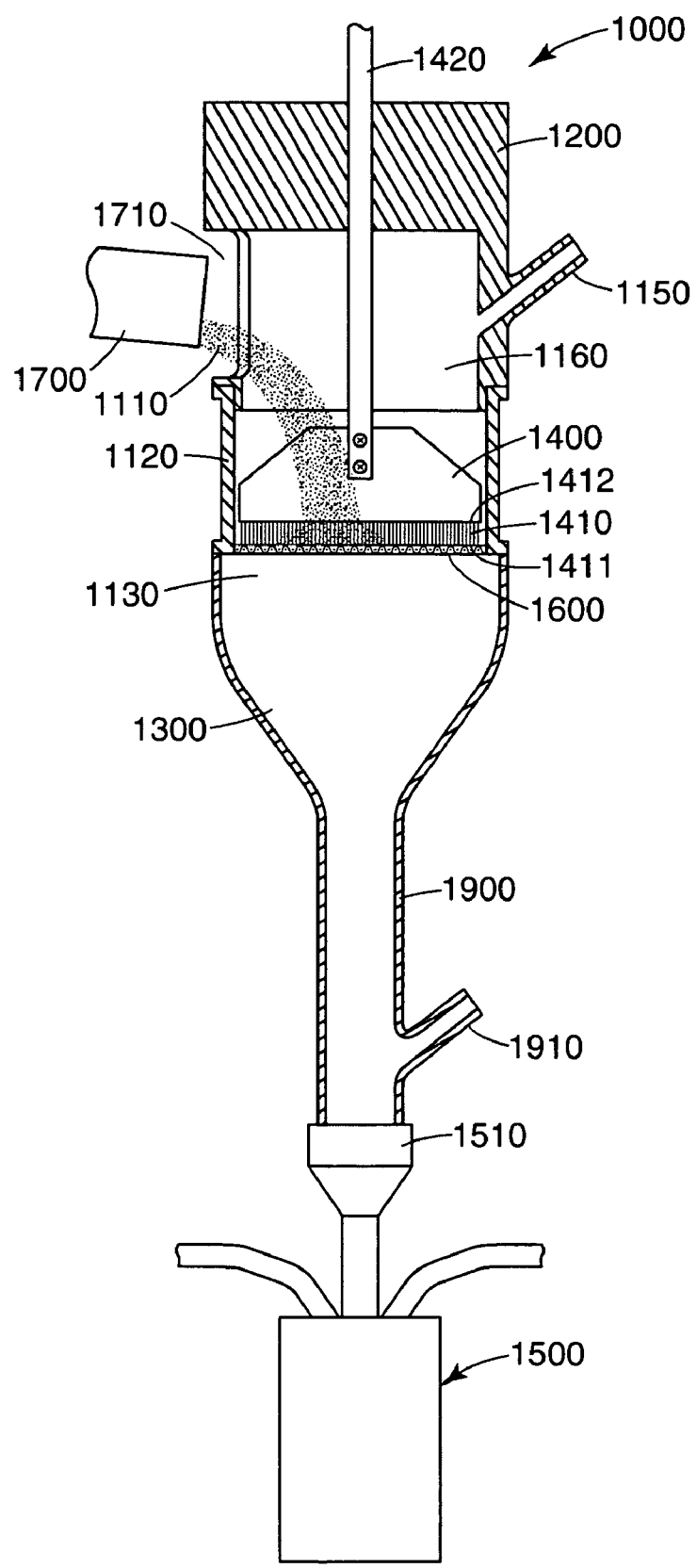
FIG. 2 is a section view of the apparatus of FIG. 1.

The present invention pertains to ceramic materials and methods of making ceramics for use in various applications, including, for example, abrasive articles (e.g., wheels and honing sticks) and cutting tools. The ceramic material is prepared by selecting the necessary raw materials and processing techniques.

Sources, including commercial sources, for the metal oxides include the oxides themselves, metal powders, complex oxides, ores, carbonates, acetates, nitrates, chlorides, hydroxides, etc.

For example, sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. The $Al_2O_3$ source may contain, or provide $Al_2O_3$, as well as one or more metal oxides other than $Al_2O_3$ (including materials of or containing complex $Al_2O_3$-metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). The rare earth oxide(s) source may contain, or provide rare earth oxide(s), as well as one or more metal oxides other than rare earth oxide(s) (including materials of or containing complex rare earth oxide other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. The $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

For embodiments comprising $ZrO_2$ and $HfO_2$, the weight ratio of $ZrO_2$:$HfO_2$ may be in a range of 1:zero (i.e., all $ZrO_2$; no $HfO_2$) to zero: 1, as well as, for example, at least about 99, 98, 97, 96, 95, 90, 85, 80, 75, 70, 65, 60, 55, 50, 45, 40, 35, 30, 25, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 15, 10, and 5 parts $HfO_2$ and a corresponding amount of $ZrO_2$.

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates, minimizes, or at least reduces insufficient heat transfer, and hence facilitates formation and homogeneity of the melt. It is also believed that the availability of the additional heat aids in driving various chemical reactions and physical processes (e.g., densification, and spheronization) to completion. Further, it is believed for some embodiments, the presence of the additional heat generated by the oxidation reaction actually enables the formation of a melt, which otherwise is difficult or not practical due to high melting point of the materials. Further, the presence of the additional heat generated by the oxidation reaction actually enables the formation of glass that otherwise could not be made, or could not be made in the desired size range. Another advantage of the invention includes, in forming the glasses, that many of the chemical and physical processes such as melting, densification and spheronizing can be achieved in a short time, so that very high quench rates may be achieved. For additional details, see U.S. Publication No. US2003-0110709A1, published Jun. 16, 2003.

In some embodiments, for example, the raw materials are fed independently to form the molten mixture. In some embodiments, for example, certain raw materials are mixed together, while other raw materials are added independently into the molten mixture. In some embodiments, for example, the raw materials are combined or mixed together prior to melting. The raw materials may be combined, for example, in any suitable and known manner to form a substantially homogeneous mixture. These combining techniques include ball milling, mixing, tumbling, and the like. The milling media in the ball mill may be metal balls, ceramic balls, and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders, then it is generally desired to use a solvent during milling. This solvent may be any suitable material with the appropriate flash point and ability to disperse the raw materials. The milling time may be from a few minutes to a few days, generally between a few hours to 24 hours. In a wet or solvent based milling system, the liquid medium is removed, typically by drying, so that the resulting mixture is typically homogeneous and substantially devoid of the water and/or solvent. If a solvent based milling system is used, during drying, a solvent recovery system may be employed to recycle the solvent. After drying, the resulting mixture may be in the form of a "dried cake". This cake-like mixture may then be broken up or crushed into the desired particle size prior to melting. Alternatively, for example, spray-drying techniques may be used. The latter typically provides spherical particulates of a desired mixture. The precursor material may also be prepared by wet chemical methods including precipitation and sol-gel. Such methods will be beneficial if extremely high levels of homogeneity are desired.

Particulate raw materials are typically selected to have particle sizes such that the formation of a homogeneous melt can be achieved rapidly. Typically, raw materials with relatively small average particle sizes and narrow distributions are used for this purpose. In some methods (e.g., flame forming and plasma spraying), particularly desirable particulate raw materials are those having an average particle size in a range from about 5 nm to about 50 micrometers (in some embodiments, in a range from about 10 nm to about 20 micrometers, or even about 15 nm to about 1 micrometer), although sizes outside of the sizes and ranges may also be useful. Particulate less than about 5 nm in size tends to be difficult to handle (e.g., the flow properties of the feed particles tended to be undesirable as they tend to have poor flow properties). Use of particulate larger than about 50 micrometers in typical flame forming or plasma spraying processes tend to make it more difficult to obtain homogenous melts and glasses and/or the desired composition.

Furthermore, in some cases, for example, when particulate material is fed in to a flame or thermal or plasma spray apparatus, to form the melt, it may be desirable for the particulate raw materials to be provided in a range of particle sizes, including agglomerated forms.

Amorphous materials, including glasses, can be made, for example, by heating (including in a flame or plasma) the appropriate metal oxide sources to form a melt, desirably a homogenous melt, and then rapidly cooling the melt to provide amorphous material. Some embodiments of amorphous material can be made, for example, by melting the metal oxide sources in any suitable furnace (e.g., an inductively or resistively heated furnace, a gas-fired furnace, or an electric arc furnace).

The amorphous material is typically obtained by relatively rapidly cooling the molten material (i.e., the melt). The quench rate (i.e., the cooling time) to obtain the amorphous material depends upon many factors, including the chemical composition of the melt, the amorphous material-forming ability of the components, the thermal properties of the melt and the resulting amorphous material, the processing technique(s), the dimensions and mass of the resulting amorphous material, and the cooling technique. In general, relatively higher quench rates are required to form amorphous materials comprising higher amounts of $Al_2O_3$, especially in the absence of known glass formers such as $As_2O_3$, $Bi_2O_3$, $B_2O_3$, $GeO_2$, $P_2O_5$, $SiO_2$, $TeO_2$, $V_2O_5$, alkaline oxides, and alkaline earth oxides. Similarly, it is more difficult to cool melts into amorphous materials in larger dimensions, as it is more difficult to remove heat fast enough.

In some embodiments of the invention, the raw materials are heated into a molten state in a particulate form and subsequently cooled into glass particles. Typically, the particles have a particle size greater than 25 micrometers (in some embodiments, greater than 50, 100, 150, or even 200 micrometers).

The quench rates achieved in making amorphous materials according to the methods of the present invention are believed to be higher than $10^2$, $10^3$, $10^4$, $10^5$ or even $10^{6\circ}$ C./sec (i.e., a temperature drop of 1000° C. from a molten state in less than 10 seconds, less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched amorphous material. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

In one method, amorphous materials can be made utilizing flame fusion as reported, for example, in U.S. Pat. No. 6,254, 981 (Castle). In this method, the metal oxide source(s) are fed (e.g., in the form of particles, sometimes referred to as "feed particles") directly into a burner (e.g., a methane-air burner, an acetylene-oxygen burner, a hydrogen-oxygen burner, and the like), and then quenched, for example, in water, cooling oil, air, or the like. Feed particles can be formed, for example, by grinding, agglomerating (e.g., spray-drying), melting, or sintering the metal oxide sources. The size of feed particles fed into the flame generally determines the size of the resulting amorhpous particles.

Some embodiments of glasses can also be obtained by other techniques, such as: laser spinning melt with free fall cooling, Taylor wire technique, plasmatron technique, hammer and anvil technique, centrifugal quenching, air gun splat cooling, single roller and twin roller quenching, roller-plate quenching, and pendant drop melt extraction (see, e.g., *Rapid Solidification of Ceramics*, Brockway et al., Metals And Ceramics Information Center, A Department of Defense Information Analysis Center, Columbus, Ohio, January, 1984). Some embodiments of glasses may also be obtained by other techniques, such as: thermal (including flame or laser or plasma-assisted) pyrolysis of suitable precursors, physical vapor synthesis (PVS) of metal precursors and mechanochemical processing. Other techniques for forming melts, cooling/quenching melts, and/or otherwise forming glass include melt-extraction, and gas or centrifugal atomization.

Gas atomization involves heating feed particles to convert them to melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as reported in U.S. Pat. No. 5,605,870 (Strom-Olsen et al.). Container-less glass forming techniques utilizing laser beam heating as reported, for example, in U.S. Pat. No. 6,482,758 (Weber), may also be useful in making glasses useful in the present invention.

An exemplary powder feeder apparatus is illustrated in FIGS. 1-6. The powder feeder assembly 1000 holds and delivers powder 1110 to a flame-melting device 1500. Flame-melting device 1500 includes powder receiving section 1510 for receiving powder 1110 for melting and transforming into another material(s), such as those disclosed herein. Powder 1110 is delivered into powder receiving section 1510 through discharge opening 1130 of powder feeder assembly 1000. Connecting tube 1900 is positioned between discharge opening 1130 and powder receiving section 1510. Also, funnel 1300 is positioned proximate to discharge opening 1130 for receiving and directing powder 1110 flow after it leaves discharge opening 1130.

Figure 6:
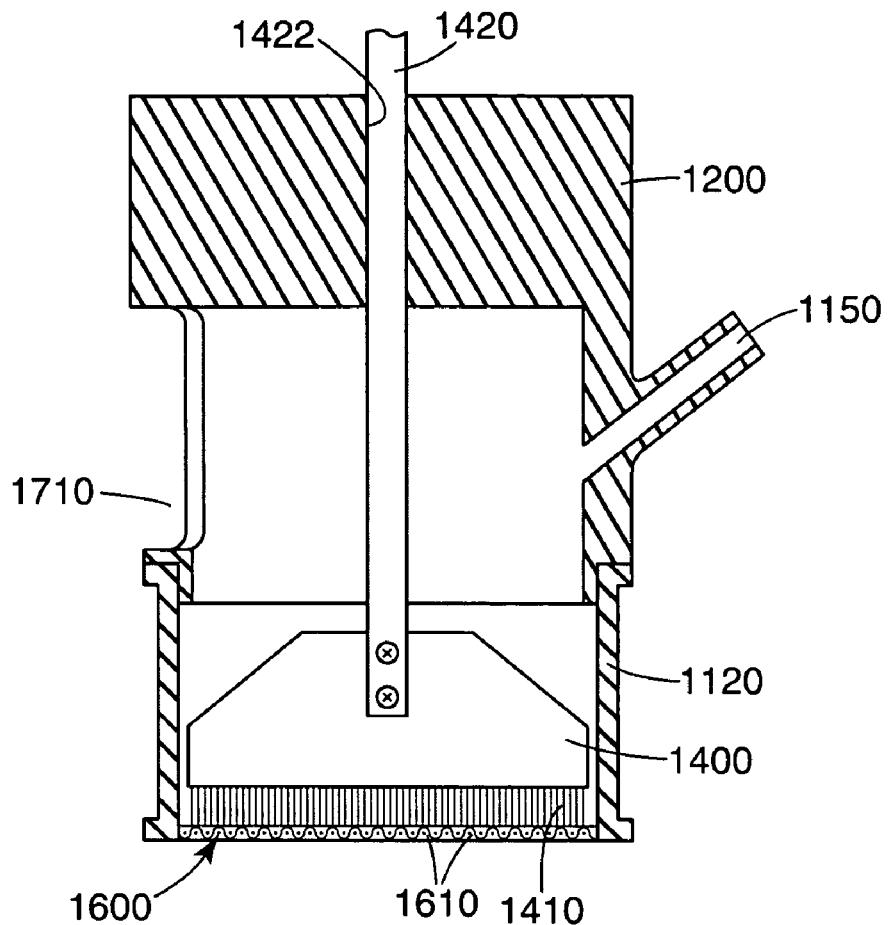
FIG. 6 is a cross-sectional view of a portion of the powder feeder assembly of FIG. 1.

Powder feeder assembly 1000 includes hopper 1100 for holding powder 1110. Typically, hopper 1100 includes body 1120 defined by a cylindrical wall, though other body shapes are possible. Also, hopper 1100 can be made from a unitary piece or multiple pieces. Hopper 1100 in the example embodiment illustrated also includes cover section 1200. Cover section 1200 includes opening 1710 for feeding powder 1110 into hopper 1100. Any commercially available delivery means can be used for filling hopper 1100 with powder 1110, such as a screw feeder, vibratory feeder, or brush feeder. Cover section 1200 can also include a section having shaft receiving opening 1422 (as illustrated in FIG. 6).

Brush assembly 1400 is disposed within hopper 1100 body 1120. Brush assembly 1400 is connected to means for rotating brush assembly 1400, such as motor 1800. Motor 1800 can also be connected to means for adjusting the speed of motor 1800, such as motor speed controller 1850. The brush assembly can use, for example a Nylon Strip Brush (e.g., (1 inch (2.5 cm) overall height, 5/16 inch (0.8 cm) bristle length and 0.02 inch (5 millimeter) diameter), part# 74715T61, available from McMaster-Carr, Chicago, Ill.). The brush assembly is coupled to a shaft, which in turn is coupled to and driven by a DC Gear Motor (130 Volt, Ratio 60:1, Torque 22 lb.in.) (available, for example, from Bodine Electric Company, Chicago, Ill.). The speed of the motor can be controlled using an adjustable motor control (e.g., a Type-FPM Adjustable Speed PM Motor Control, Model # 818, also available from Bodine.

Brush assembly 1400 includes bristle element 1410 having distal 1411 and proximate end 1412. When powder 1110 is placed into hopper 1100 for delivery to flame-melting device 1500, brush assembly 1400 is rotated within hopper 1100. When brush assembly 1400 is rotated, bristle element(s) 1410 urges powder 1110 in hopper 1100 through screening member 1600. By adjusting the rotational speed of brush assembly 1400, the feed rate of powder 1110 through screening member 1600 can be controlled.

Brush assembly 1400 cooperates with screening member 1600 to deliver powder 1110 having desired properties from discharge opening 1130 to powder receiving section 1510 of flame-melting device 1500. Distal end 1411 of bristle 1410 is located in close proximity to screening member 1600. While a small gap between distal end 1411 of bristles 1410 and screening member 1600 can be used, it is typical to keep the gap on the same order of magnitude as the particle size of the powder, however, one of ordinary skill in the art will appreciate that the gap can be much larger, depending on the particular properties of the powder being handled. Also, distal end 1411 of bristle 1410 can be positioned flush with screening member 1600 or positioned to protrude into and extend through mesh openings 1610 in screening member 1600. For bristles 1410 to protrude through openings 1610, at least some of bristles 1410 need to have a diameter smaller than the mesh size. Bristle elements 1410 can include a combination of bristles with different diameters and lengths, and any particular combination will depend on the operating conditions desired.

Extending bristle 1400 end 1411 into and through openings 1610 allows bristles 1410 to break up any particles forming bridges across openings 1610. Also bristles 1410 will tend to break-up other types of blockages that can occur typical to powder feeding. Bristle element 1410 can be a unitary piece, or can also be formed from a plurality of bristle segments. Also, if it is desired that the bristle elements extend into and/or through the mesh openings, then bristle 1410 size selected needs to be smaller than smallest mesh opening 1610.

Figure 3:
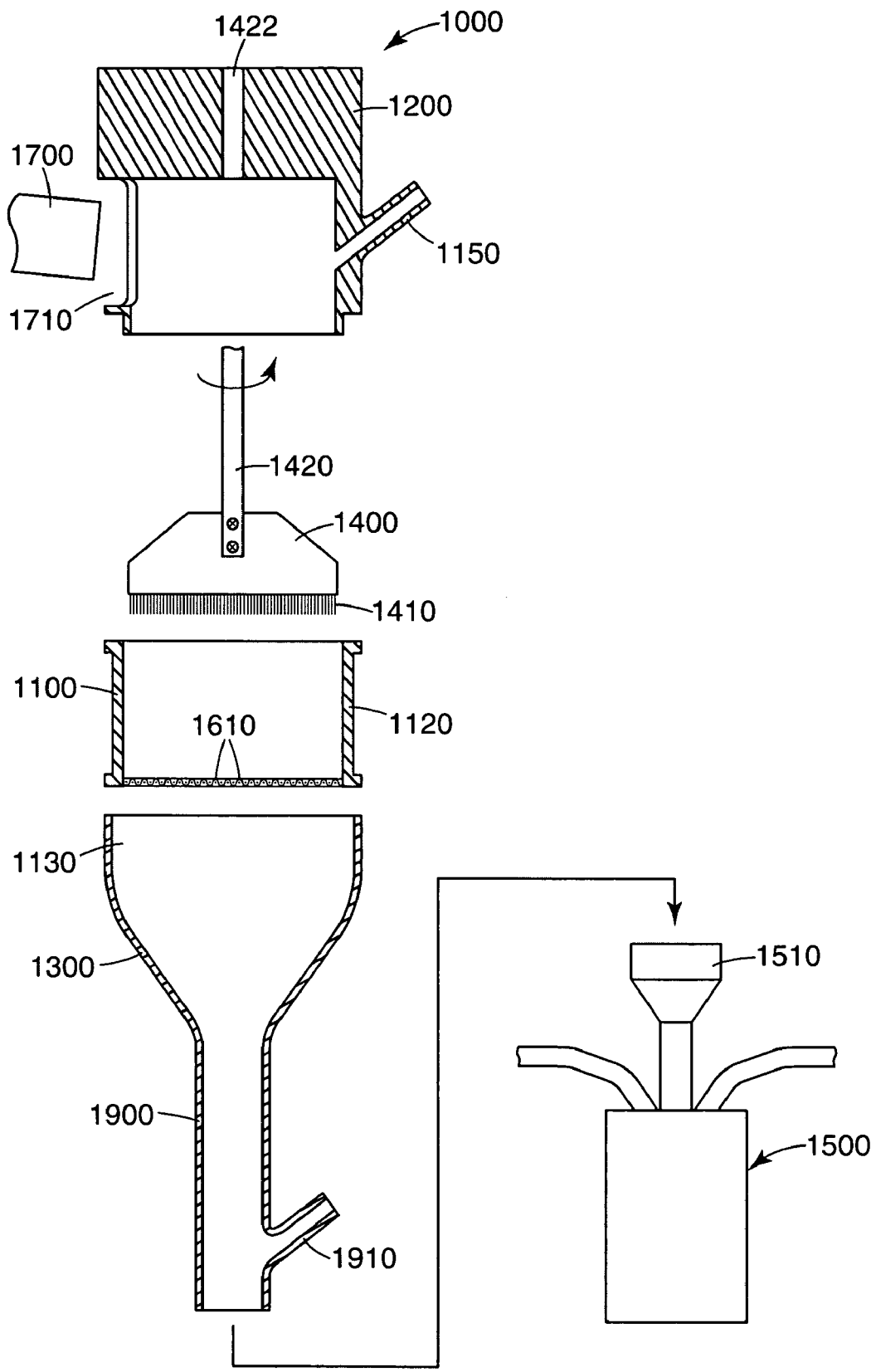
FIG. 3 is an exploded section view of the apparatus of FIG. 1.
Figures 4, 5:
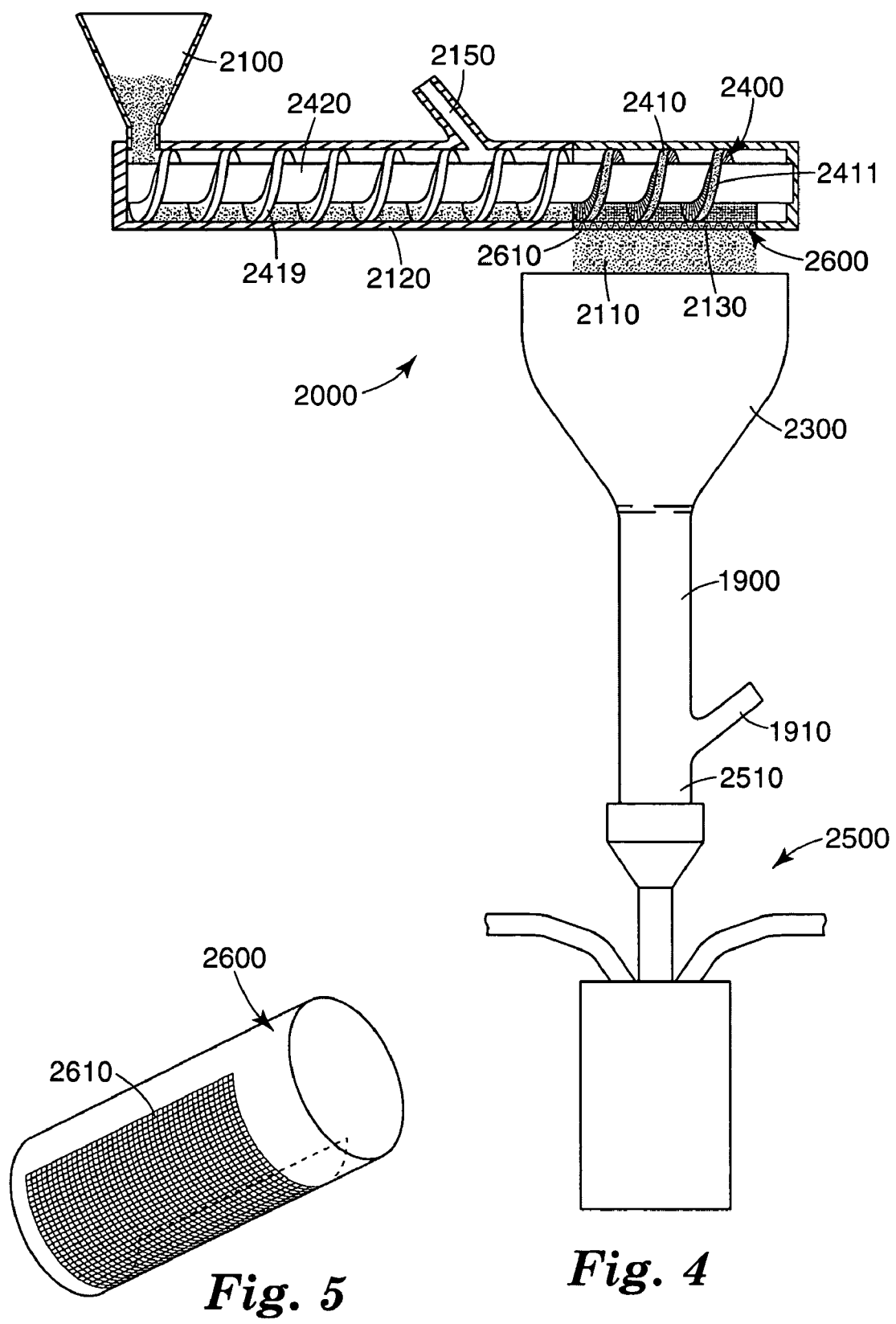
FIG. 4 is a side view of a portion of the powder feeder assembly of FIG. 1.
FIG. 5 is a perspective view of a portion of the powder feeder assembly of FIG. 1.

Referring to FIG. 3, in the exemplary embodiment illustrated, hopper 1100 can include a wall defining a cylindrical body 1120. This shape conveniently provides for symmetry that allows for a more controlled flow rate of powder from discharge opening 1130. Also, the cylindrical shape is well suited for using with rotating brush assembly 1400, since bristle element 1410 can extend to the wall, leaving little or no area on the screening member that can accumulate powder. However, other geometries are possible, as the particular conditions of use dictate.

Hopper 1100 also includes cover section 1200. Cover section 1200 has opening 1710 for receiving powder 1110 from hopper feeder assembly 1700. Cover section 1200 cooperates with body 1120 to form powder chamber 1160. Opening 1710 on cover 1200 can also be omitted or sealable so that a gas, such as nitrogen, argon, or helium can be input into gas input line 1150 on hopper 1100 for neutralizing the atmosphere or assisting in delivering the powder or particles to the flame-melting device. Also, gas can be used in the system for controlling the atmosphere surrounding the powder or particles. Also, gas input line 1910 can be placed after discharge opening 1130, for example, on connecting tube 1900.

Entire powder feeder assembly 1000 can be vibrated to further assist in powder transport. Optionally, the screening member can be vibrated to assist powder transport through powder feeder assembly 1000. One of ordinary skill in the art will recognize that other possible vibrating means can be used, and there are abundant commercial vibrating systems and devices that are available depending on the particular conditions of use.

Referring to FIGS. 1-6, when hopper 1100 includes cover 1200 and body 1120, removable cover 1200 allows easy access to powder chamber 1160 for cleaning or changing screening member 1600. Also, brush assembly 1400 can be positioned to form the desired engagement between bristle elements 1410 and screening member 1600. When brush assembly 1400 is attached to rotating shaft 1420, shaft 1420 can protrude outside opening 1422 in cover 1200 to be driven, for example, by motor 1800. The speed of brush assembly 1400 can be controlled by means such as speed controller 1850. Further details regarding this exemplary powder feeding apparatus can be found in see U.S. Publication No. US2005-0133974A1, published Jun. 23, 2005.

The addition of certain metal oxides may alter the properties and/or crystalline structure or microstructure of ceramics utilized in the present invention, as well as the processing of the raw materials and intermediates in making the ceramic. For example, oxide additions such as MgO, CaO, $Li_2O$, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease glass formation. Compositions based upon complex eutectics in multi-component systems (quaternary, etc.) may have better glass-forming ability. The viscosity of the liquid melt and viscosity of the glass in its' working range may also be affected by the addition of metal oxides other than the particular required oxide(s).

Crystallization of glasses and ceramics comprising the glass to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may change the nature of metastable phases devitrifying from the glass upon reheating. In another aspect, for ceramics according to the present invention comprising crystalline $ZrO_2$, it may be desirable to add metal oxides (e.g., $Y_2O_3$, $TiO_2$, $CeO_2$, CaO, and MgO) that are known to stabilize the tetragonal/cubic form of $ZrO_2$.

The particular selection of metal oxide sources and other additives for making ceramics utilized in the present invention typically takes into account, for example, the desired composition, the microstructure, the degree of crystallinity, the physical properties (e.g., hardness or toughness), the presence of undesirable impurities, visual appearance (e.g., coloration), and the desired or required characteristics of the particular process (including equipment and any purification of the raw materials before and/or during fusion and/or solidification) being used to prepare the ceramics.

In some instances, it may be preferred to incorporate limited amounts of metal oxides selected from the group consisting of: $B_2O_3$, $Bi_2O_3$, $Na_2O$, $P_2O_5$, $SiO_2$, $TeO_2$, $V_2O_5$, alkaline oxides, and alkaline earth oxides, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides, when used, are typically added from greater than 0 to 10% by weight collectively (in some embodiments, greater than 0 to 5% by weight collectively, or even greater than 0 to 2% by weight collectively) of the glass-ceramic depending, for example, upon the desired property.

Useful formulations include those at or near a eutectic composition(s) (e.g., ternary eutectic compositions). In addition to compositions disclosed herein, other such compositions, including quaternary and other higher order eutectic compositions, may be apparent to those skilled in the art after reviewing the present disclosure.

The microstructure or phase composition (glassy/crystalline) of a material can be determined in a number of ways, including optical microscopy, electron microscopy, differential thermal analysis (DTA), and x-ray diffraction (XRD).

Using optical microscopy, amorphous material is typically predominantly transparent due to the lack of light scattering centers such as crystal boundaries, while crystalline material shows a crystalline structure and is opaque due to light scattering effects.

A percent amorphous (or glass) yield can be calculated for particles (e.g., beads), etc. using a −100+120 mesh size fraction (i.e., the fraction collected between 150-micrometer opening size and 125-micrometer opening size screens). The measurements are done in the following manner. A single layer of particles, beads, etc. is spread out upon a glass slide. The particles, beads, etc. are observed using an optical microscope. Using the crosshairs in the optical microscope eyepiece as a guide, particles, beads, etc. that lay along a straight line are counted either amorphous or crystalline depending on their optical clarity (i.e., amorphous if they were clear). A total of 500 particles, beads, etc. are typically counted, although fewer particles, beads, etc. may be used and a percent amorphous yield is determined by the amount of amorphous particles, beads, etc. divided by total particles, beads, etc. counted. Embodiments of methods for making the amorphous (or glass) may have yields of at least 50, 60, 70, 75, 80, 85, 90, 95, or even 100 percent.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffuse intensity peak is taken as an indication of the amorphous nature of a material. The existence of both a broad peak and well-defined peaks is taken as an indication of existence of crystalline matter within a glass matrix.

In some embodiments, the amorphous particle size is selected for subsequent processing (e.g., coalescing). In some embodiments that will undergo coalescing, the amorphous material has an average particle size of less than 3 micrometers (in some embodiments, less than 2, 1, 0.75, or even less than 0.5 micrometers), in order to produce bulk amorphous material having an average cell size of less than 3 micrometers (in some embodiments, less than 2, 1, 0.75, or even less than 0.5 micrometers). Although not wanting to be bound by theory, it is believed that smaller cell sizes lead to improved mechanical properties for consolidated ceramics (e.g., higher strength and higher hardness).

The initially formed ceramic bodies (including glass prior to crystallization) may be larger in size than that desired. For example, it may be desirable for the ceramic particles comprising glass to be smaller sized particles. If the glass is in a desired geometric shape and/or size, size reduction is typically not needed. The glass or ceramic can be converted into smaller pieces using crushing and/or comminuting techniques known in the art, including roll crushing, jaw crushing, hammer milling, ball milling, jet milling, impact crushing, and the like. In some embodiments, the glass or ceramic can be classified using methods known to those skilled in the art such that only a fraction of the material with desired size characteristics is selected for further processing.

In some embodiments, the initially formed ceramic (including glass prior to crystallization) may be formed at the desired average particle size (e.g., less than 3 micrometers). Sray-pyrolysis, plasma processing, and condensation from vapors can be used to form smaller particle sizes.

According to the present invention, amorphous bodies with larger dimensions (e.g., larger than 1 mm), can be prepared by consolidating the initially formed ceramic particles. In some embodiments, articles can be made for example, via consolidation (i.e., coalescing) of the glass at temperatures above glass transition temperature. This coalescing step in essence forms a larger sized body from two or more smaller particles. For instance, the glass undergoes glass transition ($T_g$) before significant crystallization occurs ($T_x$) as evidenced by the existence of an endotherm ($T_g$) at lower temperature than an exotherm ($T_x$). The temperature and pressure used for coalescing may depend, for example, upon composition of the glass and the desired density of the resulting material. The temperature should be greater than the glass transition temperature. In certain embodiments, the heating is conducted at least one temperature in a range from about 800° C. to 1200° C. (in some embodiments, 800° C. to 1000° C., 850° C. to 1100° C., or even 900° C. to 1000° C.).

Typically, the glass bodies are under pressure (e.g., greater than zero to 1 GPa or more) during coalescence. Typically, the pressure is less than 100 MPa (15,000 psi). In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). For example, particles comprising glass (obtained, for example, by crushing) (including beads and microspheres), fibers, etc. may formed into a larger particle size. Coalescing may also result in a body shaped into a desired form (e.g., a geometric shape). Coalescing of the glass may also be accomplished by a variety of methods, including pressure-less or pressure sintering, forging, hot extrusion, etc.).

In some embodiments, coalescing can be conducted in a gaseous atmosphere (e.g., nitrogen) at a pressure greater than 1.1 atm. (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surface of at least a portion the glass being consolidated (see, for example, application having U.S. Ser. No. 10/901,638, filed Jul. 29, 2004).

In some embodiments, the coalesed article can be heat-treated to form an at least partially crystalline article. In general, heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment (or a portion thereof) of particles, for example, can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). In some embodiments, the heating of the glass bodies above the Tg and the heat-treating of the composite body are accomplished in one step.

The time at the elevated temperature may range from a few seconds (in some embodiments, even less than 5 seconds) to a few minutes to several hours. The temperature typically ranges from the $T_x$ of the glass to 1600° C., more typically from 900° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes lead to improved mechanical properties (e.g., higher strength and higher hardness). In particular, it is very desirable to form ceramics with densities of at least 90, 95, 97, 98, 99, or even at least 100 percent of theoretical density, wherein the average crystal sizes are less than 0.15 micrometer, or even less than 0.1 micrometer.

In some embodiments of the present invention, the glasses or ceramics comprising glass may be annealed prior to heat-treatment. In such cases annealing is typically done at a temperature less than the $T_x$ of the glass for a time from a few seconds to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x$-$T_g$ of glasses according to this invention may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention, should be able to provide TTT curves for glasses used to make glass-ceramics utilized in the present invention, determine the appropriate nucleation and/or crystal growth conditions to provide glass-ceramics utilized in the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. Although not wanting to be bound by theory, it is believed that atmospheres may affect oxidation states of some of the components of the glasses and glass-ceramics. Such variation in oxidation states can bring about varying coloration of glasses and glass-ceramics. In addition, nucleation and crystallization steps can be affected by atmospheres (e.g., the atmosphere may affect the atomic mobilities of some species of the glasses).

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material.

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., $2^{nd}$ edition, 1979.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, Archimedes method, or measuring the dimensions of the material before and after heat-treatment. In some cases, there may be some evolution of volatile species during heat-treatment.

In some embodiments, the relatively low shrinkage feature may be particularly advantageous. For example, articles may be formed in the glass phase to the desired shapes and dimensions (i.e., in near-net shape), followed by heat treatment to at least partially crystallize the glass. As a result, substantial cost savings associated with the manufacturing and machining of the crystallized material may be realized.

In another aspect, for example, during heat-treatment of some exemplary glasses for making glass-ceramics utilized in the present invention, formation of phases such as $La_2Zr_2O_7$ and/or cubic/tetragonal $ZrO_2$, in some cases monoclinic $ZrO_2$, may occur at temperatures above about 900° C. Although not wanting to be bound by theory, it is believed that zirconia-related phases are the first phases to nucleate from the glass. Formation of $Al_2O_3$, ReAlO$_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In general, heat-treatment times for each of the nucleation and crystal growth steps may range from a few seconds (in some embodiments, even less than 5 seconds) to several minutes to an hour or more.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "EPOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as Model JSM 840A from JEOL, Peabody, Mass.). A typical back-scattered electron (BSE) micrograph of the microstructure found in the sample is used to determine the average crystallite size as follows. The number of crystallites that intersect per unit length ($N_L$) of a random straight line drawn across the micrograph are counted. The average crystallite size is determined from this number using the following equation.

$$\text{Average Crystal Size} = \frac{1.5}{N_L M},$$

where $N_L$ is the number of crystallites intersected per unit length and M is the magnification of the micrograph.

In another aspect, glass-ceramics utilized in the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites. The crystallites present in glass-ceramics utilized in the present invention may have an average size of less than 1 micrometer, less than 0.5 micrometer, less than 0.3 micrometer, less than less than 0.2 micrometer, or even less than less than 0.15 micrometer. A plurality of crystallites, typically crystallites of at least two-phases, make up the cells of the glass-ceramic.

Examples of crystalline phases which may be present in ceramics according to the present invention include: alumina (e.g., alpha and transition aluminas), REO, $Y_2O_3$, $HfO_2$, $ZrO_2$ (e.g., cubic $ZrO_2$ and tetragonal $ZrO_2$), one or more other metal oxides such as BaO, CaO, $Cr_2O_3$, CoO, CuO, $Fe_2O_3$, $GeO_2$, $Li_2O$, MgO, MnO, NiO, $Na_2O$, $P_2O_5$, $Sc_2O_3$, $SiO_2$, $Bi_2O_3$, SrO, $TeO_2$, $TiO_2$, $V_2O_5$, ZnO, as well as "complex metal oxides" (including complex $Al_2O_3$.metal oxide (e.g., complex $Al_2O_3$.REO (e.g., ReAlO$_3$ (e.g., $GdAlO_3$, $LaAlO_3$), $ReAl_{11}O_{18}$ (e.g., $LaAl_{11}O_{18}$), and $Re_3Al_5O_{12}$ (e.g., $Dy_3Al_5O_{12}$)), complex $Al_2O_3.Y_2O_3$ (e.g., $Y_3Al_5O_{12}$), and complex $ZrO_2$.REO (e.g., $La_2Zr_2O_7$)) and combinations thereof. Typically, ceramics according to the present invention are free of eutectic microstructure features.

In some embodiments, ceramics according to the present invention further comprise $ZrO_2$ and/or $HfO_2$ up to 30 percent by weight (in some embodiments, in a range from 15 to 30 percent by weight $ZrO_2$ and/or $HfO_2$, based on the total weight of the ceramic.

It is also with in the scope of the present invention to substitute a portion of the aluminum cations in a complex $Al_2O_3$.metal oxide (e.g., complex $Al_2O_3$.REO and/or complex $Al_2O_3.Y_2O_3$ (e.g., yttrium aluminate exhibiting a garnet crystal structure)). For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further, for example, a portion of the rare earth cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g., hardness, toughness, strength, thermal conductivity, etc.) of the ceramic.

Crystals formed by heat-treating glass to provide embodiments of glass-ceramics utilized in the present invention may be, for example, acicular equiaxed, columnar, or flattened splat-like features.

Some embodiments of glasses and glass-ceramics utilized in the present invention, and some glasses used to make such glass-ceramics, comprise at least 75 percent (in some embodiments, at least 80, 85, or even at least 90; in some embodiments, in a range from 75 to 90) by weight $Al_2O_3$, at least 0.1 percent (in some embodiments, at least 1, at least 5, at least 10, at least 15, at least 20, or 23.9; in some embodiments, in a range from 10 to 23.9, or 15 to 23.9) by weight $La_2O_3$, at least 1 percent (in some embodiments, at least 5, at least 10, at least 15, at least 20, or even 24.8; in some embodiments, in a range from 10 to 24.8, 15 to 24.8) by weight $Y_2O_3$, and at least 0.1 percent (in some embodiments, at least 1, at least 2, at least 3, at least 4, at least 5, at least 6, at least 7, or even 8; in some embodiments, in a range from 0.1 to 8 or 0.1 to 5, or 0.1 to 2) by weight MgO, based on the total weight of the glass or glass-ceramic, respectively.

Some embodiments of glasses and glass-ceramics utilized in the present invention, and some glasses used to make such glass-ceramics, comprise at least 75 percent (in some embodiments, at least 80, 85, or even at least 90; in some embodiments, in a range from 75 to 90) by weight $Al_2O_3$, and at least 1 percent (in some embodiments, at least 5, at least 10, at least 15, at least 20, or even 25; in some embodiments, in a range from 10 to 25, 15 to 25) by weight $Y_2O_3$, based on the total weight of the glass-ceramic or glass, respectively.

Some embodiments of glasses and glass-ceramics utilized in the present invention, and some glasses used to make such glass-ceramics, comprise at least 75 (in some embodiments, at least 80, 85, or even at least 90) percent by weight $Al_2O_3$, and at least 10 (in some embodiments, at least 15, 20, or even at least 25) percent by weight $Y_2O_3$ based on the total weight of the glass-ceramic or glass, respectively.

For some embodiments of glasses and glass-ceramics utilized in the present invention, and some glasses used to make such glass-ceramics comprising $ZrO_2$ and/or $HfO_2$, the amount of $ZrO_2$ and/or $HfO_2$ present may be at least 5, 10, 15, or even at least 20 percent by weight, based on the total weight of the glass-ceramic or glass, respectively.

Certain glasses according to the present invention may have, for example, a $T_g$ in a range of about 750° C. to about 950° C.

The average hardness of the ceramics utilized in the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "EPOMET 3"). The sample is polished for about 3 minutes with a diamond wheel containing 125-micrometer diamonds, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991). The average hardness is an average of 10 measurements.

Certain glasses utilized in the present invention may have, for example, an average hardness of at least 5 GPa (in some embodiments, at least 6 GPa, 7 GPa, 8 GPa, or 9 GPa; typically in a range of about 5 GPa to about 10 GPa), and glass-ceramics according to the present invention or ceramics utilized in the present invention comprising glass and crystalline ceramic at least 5 GPa (in some embodiments, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa (or more); typically in a range of about 5 GPa to about 18 GPa).

Certain glasses utilized in the present invention may have, for example, a thermal expansion coefficient in a range of about $5\times10^{-6}$/K to about $1\times10^{-6}$/K over a temperature range of at least 25° C. to about 900° C.

In some embodiments, the ceramic of the present invention can be used to form abrasive articles and cutting tools and cutting tool inserts, including, for example, abrasive particles and/or the continuous bond phase (i.e., matrix) for a bonded abrasive. In some embodiments, the ceramic of the present invention can further comprise a dispersed phase, such as, for example, carbides, nitrides, borides, diamond, and combinations thereof (i.e., mixtures and solid solutions thereof). In some embodiments, the ceramic comprises up to 50 (in some embodiments, up to 45, 40, 35, 30, 25, 20, 15, or even up to 10) volume percent of a dispersed phase.

The abrasive particles can be incorporated into an abrasive article, or used in loose form. Abrasive articles according to the present invention comprise binder and a plurality of abrasive particles, wherein at least a portion of the abrasive particles are the abrasive particles according to the present invention or the binder (i.e., matrix) is a ceramic according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, preferably, at least 5, 10, 15, 20, 25, 30, 35, 40, 45, 50 55, 60, 65, 70, 75, 80, 85, 90, 95, or even 100 percent by weight of the abrasive particles in an abrasive article are the abrasive particles according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments, preferably, at least 5, 10, 15, 20, 25, 30, 35, 40, 45, 50 55, 60, 65, 70, 75, 80, 85, 90, 95, or even 100 percent by weight of the plurality of abrasive particles are the abrasive particles according to the present invention, based on the total weight of the plurality of abrasive particles.

In some embodiments, the abrasive article, cutting tool or cutting tool insert, has a (true) density, sometimes referred to as specific gravity, of at least 40% (in some embodiments, at least 45%, 50%, 55%, 60%, 65%, 70%, 75%, 80%, 95%, 90%, 95%, 96%, 97%, 98%, 99%, 99.5%, or even 100%) of theoretical density. For cutting tools and cutting tool inserts, the (true) density is typically at least 90% (in some embodiments, at least 95%, 96%, 97%, 98%, 99%, 99.5% or even 100%) of theoretical density. Typically, the (true) density of the glass-ceramic abrasive particles is typically at least 85% (in some embodiments, at least 90%, 95%, 96%, 97%, 98%, 99%, 99.5% or even 100%) of theoretical density.

Some embodiments of abrasive articles according to the present invention have a porosity in the range from 25 to 75 (in some embodiments, in a range from 35 to 65, or even 45 to 55) percent by volume. The porosity is typically present as interconnected pores. The pores may be induced by techniques known in the art, including use of additions of porous substances such as alumina or glass bubbles, and/or fugitive materials such as organic materials. Embodiments of cutting tools and cutting tool inserts according to the present invention have a porosity in the range from 0 to 10 (in some embodiments, in a range from 0 to 5, 0 to 3, or even 0 to 2) percent by volume.

In some embodiments, articles of the present invention (e.g., abrasive particles, cutting tool, cutting tool insert, etc.), have a flexural strength of at least 300 MPa (in some embodiments, at least 400, 500, or even 600 MPa).

Figure 7:
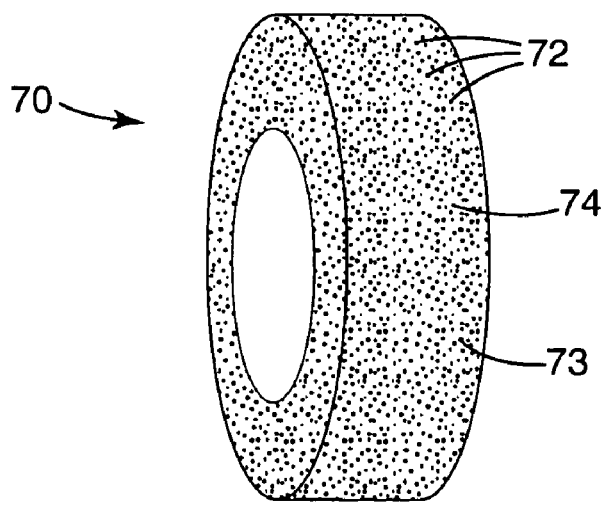
FIG. 7 is a perspective view of an exemplary abrasive wheel.

An exemplary abrasive wheel is shown in FIG. 7. Abrasive wheel 70 has glass-ceramic abrasive particles 72 and pores 73 distributed in matrix 74.

Figure 8:
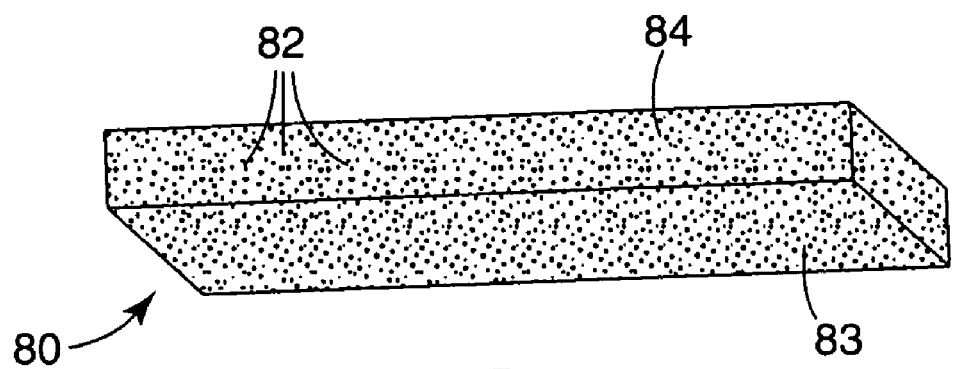
FIG. 8 is a perspective view of an exemplary honing stick.

An exemplary honing stick is shown in FIG. 8. Honing stick 80 has glass-ceramic abrasive particles 82 distributed in matrix 84.

Figure 9:
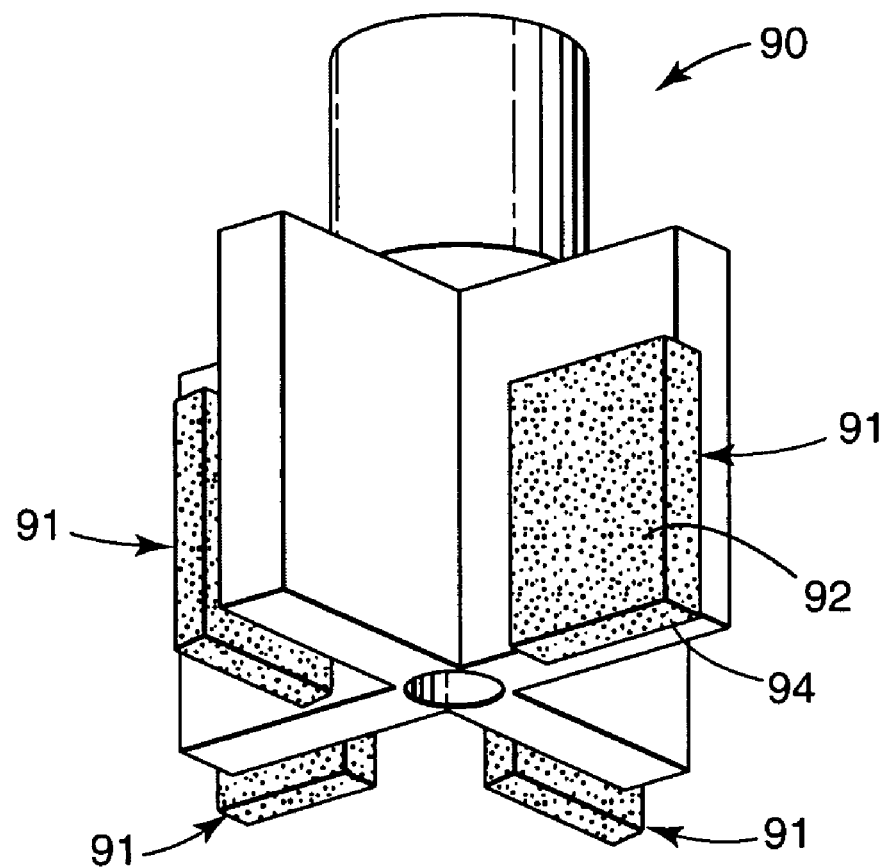
FIG. 9 is a perspective view of an exemplary cutting tool.

An exemplary cutting tool is shown in FIG. 9. Cutting tool 90 includes cutting tool inserts 91 having glass-ceramic abrasive particles 92 distributed in matrix.

Advantages and embodiments of this invention are further illustrated by the following non-limiting examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $As_2O_3$, $Bi_2O_3$, $B_2O_3$, $GeO_2$, $P_2O_5$, $SiO_2$, $TeO_2$, $V_2O_5$, alkaline oxides, and alkaline earth oxides.

EXAMPLE 1

A 50000-ml porcelain jar was charged with a mixture of various powders (as shown below in Table 1, with sources of the raw materials listed in Table 3) and 24000 grams of water and 40000 g of alumina balls (15 mm in diameter). The contents of the jar were mixed for 16 hours at 60 revolutions per minute (rpm). After the mixing, the slurry was spray-dried to produce agglomerated precursor powder with 60-90 microns agglomerate size.

After calcining the agglomerated powder at 1250° C. the powder was fed slowly (0.2 gram/second) into a propane/oxygen torch flame to melt the particles. The torch used to melt the particles, thereby generating molten droplets, was a Koshin Rikagaku burner KA-40 obtained from Koshin-Rikagaku Co.Tokyo.Japan. Propane and oxygen flow rates for the torch were as follows. For the center flame (Pre-mixed combustion), the propane flow rate was 5 standard liters per minute (SLPM) and the oxygen flow rate was 6 SLPM. For the outer flame, the propane flow rate was 15 SLPM and the oxygen flow rate was 80 SLPM. The calcined and sized particles were fed slowly (0.2 gram/second) into the torch flame which melted the particles and carried them directly into air to quench and collected in a stainless steel pan container. The particles were spherical in shape (hereinafter referred to as "beads") and varied in size from a few micrometers up to 150 micrometers and were either transparent (i.e., amorphous) and/or opaque (i.e., crystalline), varying bead-to-bead. Especially most of beads sized 90 micron-32 micron were transparent. Larger beads and smaller beads tended to include opaque beads.

For differential thermal analysis (DTA), a material was screened to retain beads (microspheres) in the 90-125 micrometer size range. DTA runs were made (using an instrument obtained from Netzsch Instruments, Selb, Germany under the trade designation "NETZSCH STA 409 DTA/TGA"). The amount of each screened sample placed in the 100 microliter $Al_2O_3$ sample holder was 400 milligrams. Glass transition ($T_g$) and crystallization ($T_x$) of the material was determined by heating beads in static air at a rate of 10° C./minute from room temperature (about 25° C.) to 1300° C. These $T_g$ and $T_x$ values for other examples are reported in Table 1 and 2, below.

TABLE I

| Example | Batch amounts, g | Weight percent of components | Percent amorphous yield | Glass transition, Tg ° C. | Glass Crystallization, Tx ° C. |
|---|---|---|---|---|---|
| 1 | $Al_2O_3$: 19360 g<br>La2O3: 16600 g<br>Gd2O3: 5025 g<br>$ZrO_2$: 9288 g | $Al_2O_3$: 38.5<br>La2O3: 33<br>Gd2O3: 10<br>$ZrO_2$: 18.5 | 99 | 843 | 925 |

3800 g of glass beads were mixed with 4200 g of de-ionized water and 5 g of ammonium salt of polyacrylic acid (Darvan 821A). The mixture was subjected to a two stage milling procedure. In the first step, high intensity bead milling was conducted with the use of Drais mill (type PML-HIV PU) using 1.75 mm yttria-stabilized zirconia (YSZ) as grinding media. In the second step, milling in Drais, Advantis V15-PU mill with finer YSZ media (0.3-0.4 mm) was performed. The resultant glass particles had an average particle size of 0.38 microns as determined using laser scattering method with Horiba 910 instrument.

About 50 grams of the milled glass particles was placed in a graphite die and hot-pressed using uniaxial pressing apparatus (obtained under the trade designation "HP-50", Thermal Technology Inc., Brea, Calif.). The hot-pressing was carried out at 1300° C. in nitrogen atmosphere and 4 ksi (27.6 MPa) pressure. The resulting disk was about 48 mm in diameter, and about 5 mm thick. Additional hot-press runs were performed to make additional disks. The density of the hot-pressed material was measured using Archimedes method, and found to be about 5.5 g/cm³ which is 99% of theoretical density.

Comparative Example A

About 50 grams of the precursor glass beads (i.e., glass beads prior to two stage milling procedure) prepared as described in Example 1 were placed in a graphite die and hot-pressed using uniaxial pressing apparatus (obtained under the trade designation "HP-50", Thermal Technology Inc., Brea, Calif.) according to the same schedule used in Example 1.

Figure 10:
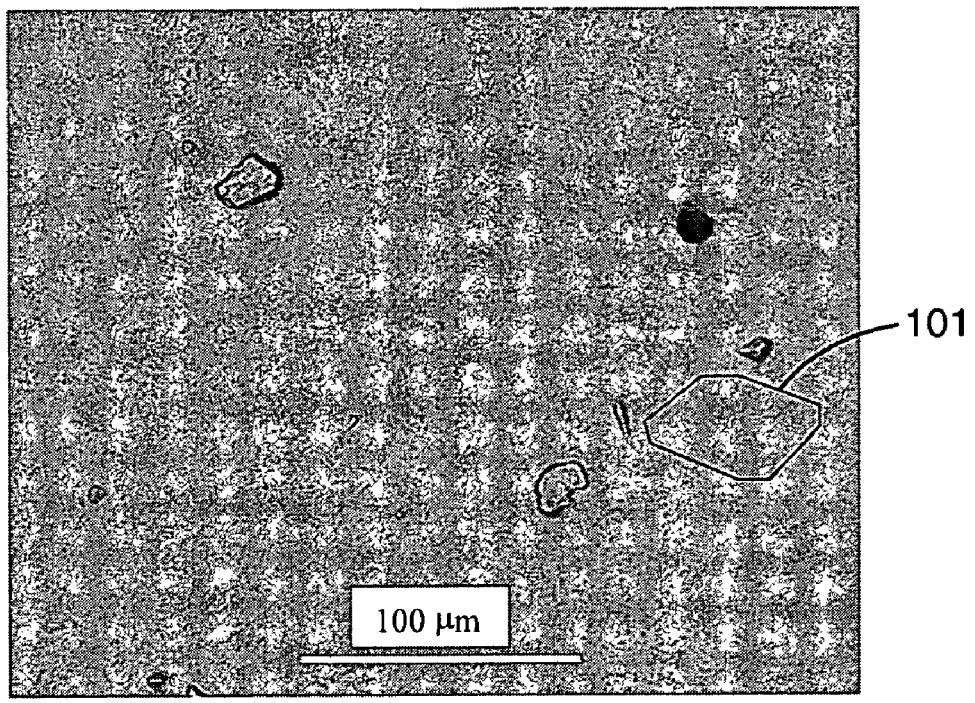
FIG. 10 is a SEM micrograph of Comparative Example C.
Figure 11:
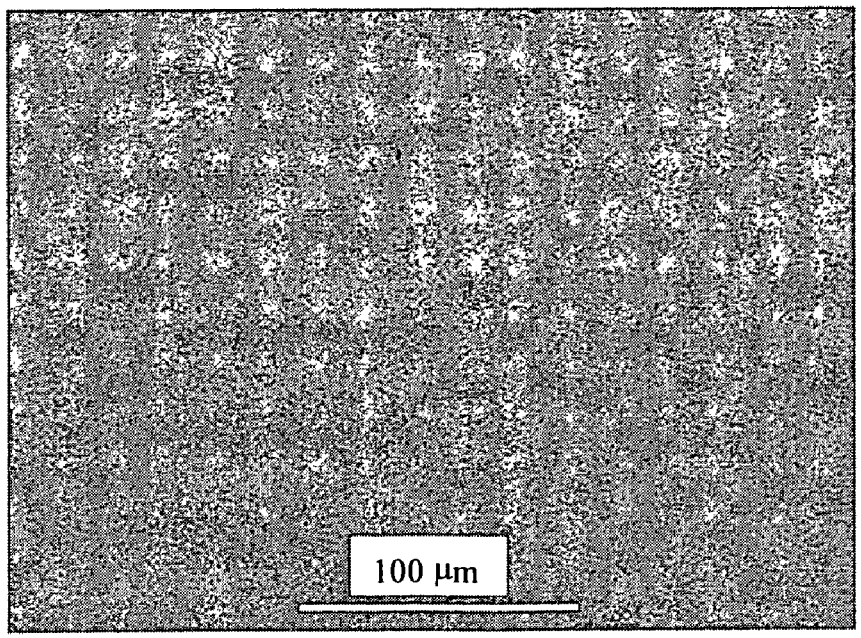
FIG. 11 is a SEM micrograph of Example 3.

FIG. 10 is a scanning electron microscope (SEM) photomicrograph of a polished section of Comparative Example A material, indicating an exemplary cell 101. FIG. 11 is a SEM photomicrograph of a polished section of Example 1. The polished section was prepared using conventional mounting and polishing techniques. Polishing was done using a polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, and 3 micrometers diamond slurries. The polished sample was coated with a thin layer of gold-palladium and viewed using JEOL SEM (Model JSM 840A). It is evident that material of Example 1 is made up of cells that are below 3 microns in size, which is significantly smaller than that of Comparative Example A.

Three Point Flexural Properties According to ASTM C1161 were measured using Configuration A procedure. Samples were machined to nominal thickness of 1.5 mm, width 2.0 mm and length 30 mm. The crosshead speed was set at 0.2 mm/min. In the three point bend test, the span was set at 20 mm. An Alliance MTS 100 Testframe was used in conjunction with Testworks IV software for testing and data acquisition.

Average flexure strength of Example 1 material was 563 MPa, and of the Comparative Example A material was 169 MPa.

EXAMPLE 2

About 18 g of milled beads of Example 1 were cold-pressed into a cylindrical part with 10×16 mm in diameter at 16,000 lb in a cavity of a stainless steel die. Subsequently, pressureless sintering in air was conducted in a furnace (an electrically heated furnace (obtained under the trade designation "Model KKSK-666-3100" from Keith Furnaces of Pico Rivera, Calif.)) as follows. The material was heated from room temperature (about 25° C.) to about 1375° C. at a rate of about 10° C./min. and then held at 1375° C. for about 2 hours. Additional runs were performed with the same heat-treatment schedule to make additional sintered parts. The density of the resulting sintered material was measured using Archimedes method, and found to be 5.4 g/cm³ which was about 97% of theoretical density.

Comparative Example B

About 18 g of beads of Comparative Example A were cold-pressed and sintered as described in Example 2. Only partial sintering was observed which precluded accurate density determination.

EXAMPLE 3

Example 3 precursor beads were prepared as described in Example 1, except the raw materials, the amounts of raw materials, used are listed in Table 2, below. The sources of the raw materials used are listed in Table 3, below.

TABLE 2

| Example | Batch amounts, g | Weight percent of components | Percent amorphous yield | Glass transition, ° C. | Glass Crystallization, ° C. |
|---|---|---|---|---|---|
| 3 | Al₂O₃: 6600 g Y₂O₃: 3400 g | Al₂O₃: 66 Y₂O₃: 34 | 97 | 875 | 926 |

Glass bead milling was conducted as described in Example 1 material except that 3100 g of beads and 4900 DI water was used. The average particle size after milling, determined as described in Example 1 was 0.28 microns.

About 50 grams of the milled glass bodies were placed in a graphite die and hot-pressed using uniaxial pressing apparatus (obtained under the trade designation "HP-50", Thermal Technology Inc., Brea, Calif.). The hot-pressing was carried out at 1400° C. in nitrogen atmosphere and 4 ksi (27.6 MPa) pressure. The resulting disk was about 48 mm in diameter, and about 6.2 mm thick. Additional hot-press runs were performed to make additional disks. The density of the hot-pressed material, measured by Archimedes method was found to be about 4.2 g/cm³ which is 99% of theoretical density.

TABLE 3

| Raw Material | Source |
|---|---|
| Alumina powder (Al₂O₃) | Obtained from Condea Vista, Tucson, AZ under the trade designation "APA-0.5" |
| Yttrium oxide powder (Y₂O₃) | Obtained from Molycorp Inc., Mountain Pass, CA |
| Gadolinium oxide powder (Gd₂O₃) | Obtained from Molycorp Inc., Mountain Pass, CA |
| Lanthanum oxide powder (La₂O₃) | Obtained from Molycorp Inc. |
| Yttria-stabilized zirconium oxide powder (Y-PSZ) | Obtained from Zirconia Sales, Inc. of Marietta, GA under the trade designation "HSY-3" |

Comparative Example C

About 50 grams of the precursor glass beads prepared as described in Example 3 were placed in a graphite die and hot-pressed using uniaxial pressing apparatus (obtained under the trade designation "HP-50", Thermal Technology Inc., Brea, Calif.) according to the same schedule used in Example 3.

Flexural strength of materials of Example 3 and Comparative Example C was measured as described in Example 1 and was found to be 579 and 123 respectively.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Amorphous material comprising at least 35 percent by weight $Al_2O_3$, based on the total weight of the amorphous material, and a metal oxide other than $Al_2O_3$, wherein the amorphous material contains not more than 10 percent by weight collectively $As_2O_3$, $B_2O_3$, $Bi_2O_3$, $GeO_2$, $P_2O_5$, $SiO_2$, $TeO_2$, and $V_2O_5$, based on the total weight of the amorphous material, and wherein the amorphous material comprises a plurality of cells having an average cell size of less than 3 micrometers.

2. The amorphous material of claim 1 wherein the amorphous material has x, y, and z dimensions each perpendicular to each other, and each of the x and y dimensions is at least 5 mm.

3. The amorphous material according to claim 1 wherein the amorphous material does not have a $T_g$.

4. The amorphous material according to claim 1 wherein the amorphous material is a glass.

5. The amorphous material of claim 1 further comprising CaO or $ZrO_2$ and a third metal oxide other than $Al_2O_3$, CaO, and $ZrO_2$, wherein at least a portion of the third metal oxide forms a distinct crystalline phase when the amorphous material is crystallized.

6. The amorphous material according to claim 1 wherein the metal oxide other than $Al_2O_3$ is $Y_2O_3$.

7. The amorphous material according to claim 1 wherein the metal oxide other than $Al_2O_3$ is $ZrO_2$.

8. The amorphous material according to claim 1 wherein the metal oxide other than $Al_2O_3$ is REO.

9. An article comprising the amorphous material according to claim 1.

10. The amorphous material according to claim 1 wherein the plurality of cells have an average cell size of less than 2 micrometers.

11. The amorphous material according to claim 1 wherein the plurality of cells have an average cell size of less than 1 micrometer.

* * * * *